United States Patent [19]

Harmony

[11] 4,077,571

[45] * Mar. 7, 1978

[54] FLUID FLOW REGULATOR

[75] Inventor: Richard C. Harmony, Tucson, Ariz.

[73] Assignee: Harmony Emitter Company, Tucson, Ariz.

[*] Notice: The portion of the term of this patent subsequent to Nov. 4, 1992, has been disclaimed.

[21] Appl. No.: 744,291

[22] Filed: Nov. 23, 1976

Related U.S. Application Data

[63] Continuation of Ser. No. 604,146, Aug. 13, 1975, Pat. No. 3,993,248.

[51] Int. Cl.² .............................................. B05B 1/20
[52] U.S. Cl. ..................................... 239/107; 138/46; 239/533.13; 239/542; 239/547

[58] Field of Search .......... 239/107, 108, 109, 533.13, 239/542, 547; 138/44, 45, 46

[56] References Cited

U.S. PATENT DOCUMENTS

| | | | |
|---|---|---|---|
| 3,917,169 | 11/1975 | Harmony | 239/547 X |
| 3,970,251 | 7/1976 | Harmony | 239/547 X |
| 3,993,248 | 11/1976 | Harmony | 239/542 X |

Primary Examiner—Robert W. Saifer
Assistant Examiner—Michael Mar
Attorney, Agent, or Firm—Cahill, Sutton & Thomas

[57] ABSTRACT

A non-clogging regulator controls the rate of fluid flow from within a fluid conveying conduit regardless of pressure variations within the conduit and irrespective of the presence of particulate matter within the fluid.

16 Claims, 14 Drawing Figures

FLUID FLOW REGULATOR

This is a continuation of application Ser. No. 604,146, filed Aug. 13, 1975, now U.S. Pat. No. 3,993,248.

The present application is related to a patent application entitled "Pipe Insertable Emitter for Irrigation Systems", filed Mar. 6, 1975 and assigned Ser. No. 555,945, now U.S. Pat. No. 3,970,251, and a patent application entitled "Emitter for Irrigation Systems", filed Dec. 16, 1974 and assigned Ser. No. 532,869, now U.S. Pat. No. 3,917,169, which application in turn is a continuation-in-part of a patent application entitled "EMITTER FOR IRRIGATION SYSTEMS", filed on Apr. 1, 1974, and assigned Ser. No. 456,617, now U.S. Pat. No. 3,899,136; all of the above applications describe inventions made by the present inventor and assigned to the present assignee.

The present invention relates to fluid dispersing apparatus and, more particularly, to a flow regulator for dispersing a fluid from within a conduit at a constant flow rate regardless of fluid pressure variations within the conduit.

Irrigation devices of various types have been available for a number of years. These devices may generally be classified in one of two categories: those intended for home use and those intended for industrial application.

The devices intended for home use are usually attachable to a standard water hose and include a multiport pressure reducing chamber. The water outflow is at a sufficiently low rate so as not to erode the soil from about the plant roots. The rate of water flow is, however, dependent upon the water pressure within the water hose. Therefore, some judgment must be exercised in controlling the flow of water through the water hose. This problem is exacerbated where a plurality of devices are attached to a common water hose.

Where clean water is used, no clogging problems usually develop; however, if the water contains particulate matter of greater than microscopic size, one or more ports within the device(s) generally become clogged. Such clogging causes a resulting increase in the rate of water flow through the remaining ports. The force of the increased water flow can and often does cause erosion of the surrounding soil. Moreover, clogging of several ports may sufficiently restrict the volume of water output from one or more devices to prevent adequate irrigation and it will affect the water flow through the remaining devices.

The devices intended for industrial use are generally connected to a source of irrigation water, that is, water which does contain suspended particulate matter. To overcome the clogging effects of the particulate matter, the outlet ports in these devices are generally of resilient material to permit them to expand as necessary to pass the particulate matter. Where a port expands to pass the particulate matter, the rate of water flow therethrough simultaneously increases. The increased water flow tends to reduce the water pressure within the common envelope feeding the devices and results in a reduction of water flow through the remaining devices. Thereby, uneven irrigation often results. Due to ageing, the resilient material may not be able to contract to its initial size and thereby may contribute to an uneven rate of water discharge.

Where a plurality of non-self regulating water discharge devices or ports are disposed along a length of hose, a substantial pressure gradient exists through the length of the hose. The pressure gradient, in turn, tends to cause a proportional water outflow from the devices or their ports. Such variation in water flow produces non-uniform irrigation along the length of the hose.

The following patents are representative of the state of the art in soakers and irrigation devices: U.S. Pat. Nos. 2,851,306, 3,698,195, 3,303,800, 3,116,019, 3,685,735, 3,788,544, 3,667,685, 3,808,124, 3,221,996, 3,552,654, 3,767,124, 3,780,946, 3,779,468, 1,366,685 and 3,777,987.

Because of the nature of the above described devices, their application has been generally limited to that of fruit bearing bushes and trees and other plants which need not be replanted seasonally. For seasonal and machine harvested plants, such as the various grains, vegetables and fruits, the labor costs attendant the laying out and retrieval of the above described devices generally precludes them from being practical for irrigation purposes. For such crops, irrigation devices must be capable of being laid by machine and must be sufficiently inexpensive to permit discarding them. Necessarily, the devices cannot be discarded unless they will decompose between growing seasons.

It is therefore a primary object of the present invention to provide a fluid discharge device which discharges fluid at a constant rate despite variations in fluid pressure.

Another object of the present invention is to provide a fluid discharge device which will pass suspended particulate matter.

Yet another object of the present invention is to provide a fluid discharge device which is formable as an integral part of a conduit conveying the fluid to be discharged.

Still another object of the present invention is to provide a fluid discharge device which is insertable through apertures within a fluid conduit.

A further object of the present invention is to provide a fluid discharge device which is sufficiently inexpensive to afford discarding it after use.

A yet further object of the present invention is to provide a biodegradable fluid discharge which is particularly suitable for use in irrigating seasonal crops.

A still further object of the present invention is to provide a fluid discharge device suitable for implantation within living bodies.

These and other objects of the present invention will become apparent to those skilled in the art as the description thereof proceeds.

The present invention may be described with greater specificity and clarity with reference to the following drawings, in which.

Figure 1:
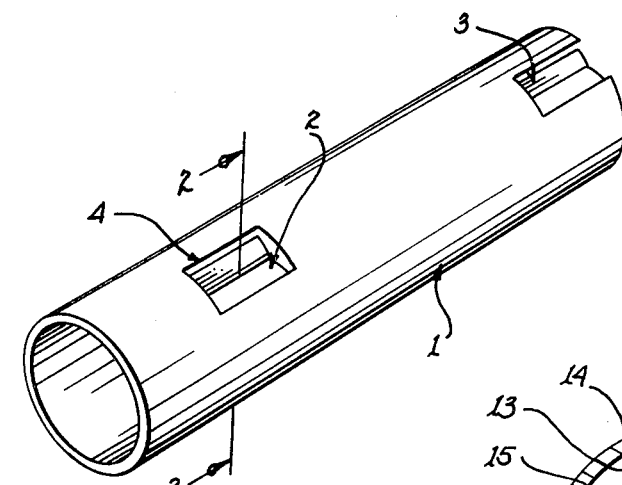
FIG. 1 is a perspective view of a fluid conveying conduit incorporating fluid flow regulators.

FIG. 1 illustrates a fluid conveying conduit 1 having fluid flow regulators 2 and 3 disposed within the wall thereof in proximity to suitably configured apertures. The number of regulators, as well and the spacing therebetween, is essentially a function of the fluid disebetween needs attendant the position of the conduit. It may be noted that regulators 2 and 3 do not protrude beyond the periphery of conduit 1 and hence do not in any manner impose special handling or storage restrictions which might otherwise be present to prevent damage to the regulators. The conduit itself may be flexible or rigid and formed of metallic, plastic or other materials, the selection of which has no appreciable affect upon the emitters or their operation.

The constructional details of a regulator, such as regulator 2, will be described with respect to FIGS. 2, 3, 4 and 5.

Regulator 2 is formed by a pair of elements 6 and 6a mounted within conduit 1 in shielding relationship to aperture 4. In the following discussion of the constructional details of elements 6 and 6a, only element 6 will be described in detail; it is to be understood that the parts of element 6a identified by a numeral with the subscript "a" are similar to the correspondingly numbered parts of element 6.

Element 6 is formed by a downwardly depending skirt 9, which skirt terminates at a downwardly and laterally extending lip 10. The edge formed by the junction therebetween is identified by numeral 16. The skirt depends downwardly from and essentially orthogonal to a planar section 11. The junction between the skirt and the planar section defines a sharp edge 12. The planar section is attached to the inner surface 15 of conduit 1 through a laterally extending shoulder 13. Side 14 of shoulder 13 is bonded to surface 15 by means such as adhesives, chemical reaction, heat, etc.

Element 6 is oriented with respect to conduit 1 to position edge 12 in a parallel relationship with the longitudinal axis of the conduit and at the approximate midpoint of aperture 4. Thus, planar section 11 extends laterally from the center of the aperture to edge 7 and is essentially coincident with one-half of the area of the aperture. Similarly, edge 12a of element 6a is parallel to the axis of conduit 1 and in contacting relationship with edge 12. Thus, planar section 11a is generally coincident with the remaining half of the aperture. As suggested by FIG. 3, the longitudinal extremities 24, 25 of planar sections 11 and 11a are bonded or otherwise attached to the inner surface 15 adjacent the longitudinal edges 17 and 18 of aperture 4. Thereby, the point of attachment of elements 6 and 6a to surface 15 circumscribes the aperture and communication from within conduit 1 to without the conduit is possible only intermediate edges 12 and 12a.

Figure 5:
FIG. 5 is a partial cross-sectional view taken along lines 5—5, as shown in FIG. 3.

The inner faces of skirts 9 and 9a will be described with particular reference to FIGS. 3, 4 and 5. A trapezoidallike area of the inner face of skirt 9 is striated by a plurality of stria or striae 20. The striae are oriented at an angle of approximately 15° with respect to bottom edge 16 of skirt 9. Planar surfaces 21 and 22 are disposed lateral to striae 20 and lie within a plane approximately coincident to the peaks of the striae. A similar planar surface 23 interconnects surfaces 21 and 22 above the striae. The upper edges of surfaces 21, 22 and 23 terminate at edge 12. The lower edges of surfaces 21 and 22, as well as the lower edge of the trapezoidal-like area defined by striae 20 terminate at edge 16.

In horizontal cross-section, planar surfaces 21 and 22 taper toward the lateral extremity thereof in order to render them highly flexible and responsive to changes in pressure on either side thereof.

Lip 10, extending downwardly and laterally from skirt 9 is essentially rectangular is cross-section. It tends to prevent more than nominal flexing of the central part of skirt 9 defined by striae 20. Moreover, it serves in the nature of a funnel to channel fluid intermediate flanges 9 and 9a and prevents collapse thereof which would result in a seal intermediate edges 16 and 16a.

In operation, the fluid under pressure within conduit 1 will flow intermediate lips 10 and 10a into the passageway defined by striae 20 and 20a and discharge through outlet 19 defined by edges 12 and 12a. Because the ridges within striae 20 and 20a are oriented at an angle of approximately 15° with respect to edges 16 and 16a, respectively, and oriented with respect to one another at an angle of approximately 150°, they will cause the fluid flow intermediate skirts 9 and 9a to be random and turbulent. The randomness and turbulence of the fluid flow will establish a fluid pressure gradient from edges 16, 16a to outlet 19. Simultaneously, the fluid within conduit 1 will exert pressure upon the outer or opposite surfaces 26, 26a of skirts 9 and 9a, respectively, which pressure forces the skirts toward one another and restrains separation therebetween. Hence, the lateral expansion of skirts 9 and 9a produced by the fluid pressure intermediate the skirts is countered by the fluid pressure acting upon the outer surfaces of the respective skirts. Since the fluid pressure decreases from edges 16, 16a to edges 12, 12a intermediate the skirts due to the pressure gradient and the pressure adjacent outer surfaces 26, 26a remains essentially constant therealong, the upper part of the skirts will be biased toward one another and separation of edges 12 12a will be restrained. That is, the skirts are pressure compensating and regulate the size of the passageway intermediate striae 20 and 20a through outlet 19. Thus, the rate of fluid discharge from the regulator is a function of the striated surfaces of skirts 9 and 9a and is independent of the fluid pressure within conduit 1.

Due to the flexibility of the lateral edges of skirts 9 and 9a and the planar surfaces thereof adjacent one another, a pressure gradient will not be established adjacent thereto. Instead, the fluid pressure within the conduit will tend to force the lateral edges of the skirts toward one another and develop a seal therebetween. Thus, the fluid flow through outlet 19 is essentially limited to that fluid flow which occurs intermediate striae 20 and 20a. Opposed planar surfaces 23, 23a aid in defining outlet 19 and are restrained from flexure due to the mass attendant the junction between the respective skirt and planar section.

Should the fluid pressure within conduit 1 vary at different locations of the regulators, each regulator will accommodate such variation while providing an essentially constant rate of fluid discharge therefrom. As stated above, the interstices between the skirts determine the fluid flow which will always occur regardless of the amount of fluid pressure within conduit 1. This results because a higher level pressure gradient intermediate skirts 9 and 9a would tend to laterally displace the skirts from one another and thereby expand the passageway. Such expanded passageway would, of course, increase the water flow rate therethrough and through outlet 19. However, the expansion is inhibited by the simultaneous increase in fluid pressure adjacent the outer surfaces 26, 26a of skirts 9 and 9a. The increase in fluid pressure thereon will tend to force striae 20 and 20a adjacent one another and restrict fluid flow therebetween. Moreover, the pressure differential established by the pressure gradient may possibly compress opposed ridges of the striated surfaces in proximity to edges 12, 12a to minimize the size of the interstices and constrain a flow rate increase commensurate with the fluid pressure increase. Thus, a predetermined and regulated fluid flow will occur through each regulator despite an increase in the fluid pressure within conduit 1.

If the fluid within conduit 1 is contaminated by suspended particulate matter, it is quite likely that the particulate matter will be forced intermediate skirts 9 and 9a. Should the particulate matter be to large to flow freely through the interstices, it may become lodged intermediate the striated surfaces. In order for the particulate matter to become lodged, it will have to exert a lateral force upon each of the skirts 9 and 9a. Such a lateral force will tend to displace the surfaces from one another. The increased displacement will tend to minimize the pressure gradient and increase the fluid flow rate in proximity thereto and establish a force to propel the particulate matter through inlet 19. Thus, the emitter is both self cleaning and non-clogging.

Although many techniques for manufacturing the present invention may become apparent to those skilled in the art, it is particularly well suited for manufacture in accordance with the below described method. Elements 6 and 6a, being identical with one another, are inexpensively formable by means of presently available molding technology. Conduit 1 can be formed of a ribbon of flexible material wherein a plurality of apertures 4 have been formed. While the conduit is still in its ribbon form, elements 6 and 6a are bondable thereto in proximity to each of the apertures by presently available machinery. After attachment of elements 6 and 6a, the longitudinal edges of the ribbon are bonded to one another to form the illustrated tubular structure. This bonding can be made by use of adhesives, chemical action, heat, or other means. Thus, a conduit 1 incorporating the present invention can be formed of any length and breadth by presently known mass production techniques. It may also be appreciated that each of the above described steps are relatively simple and straightforward which renders the fabrication technique relatively inexpensive and commercially competitive with all known and existing related apparatus.

Figure 6:
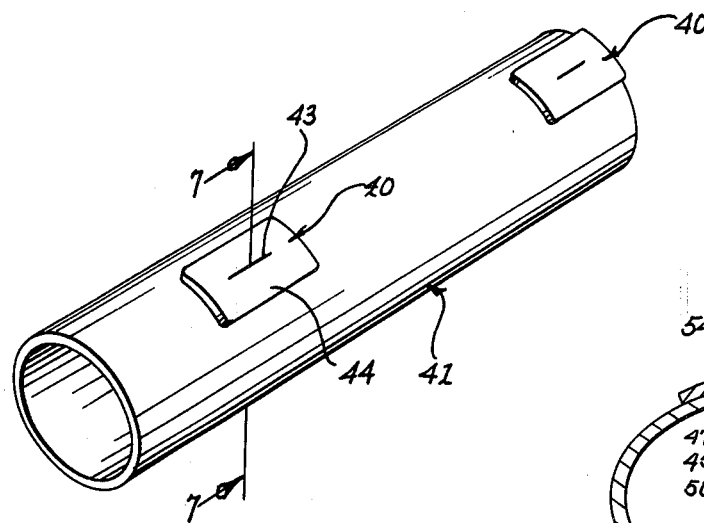
FIG. 6 is a perspective view of a fluid conveying conduit incorporating a fluid flow regulator variant.

A variant of the present invention is generally illustrated in FIG. 6 and with more specific details thereof being shown in FIGS. 7–11. The variant is particularly well suited wherein existing conduits must be employed or wherein the environment requires that conduits not adaptable to the embodiment illustrated in FIG. 1 be employed.

Figure 7:
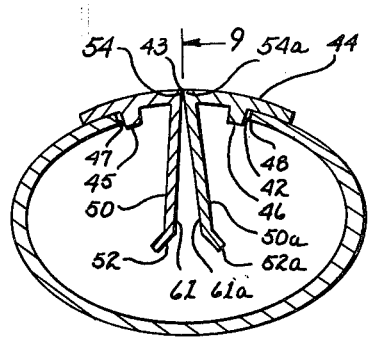
FIG. 7 is an end view of a conduit incorporating the variant and taken along lines 7—7, as shown in FIG. 6.
Figure 8:
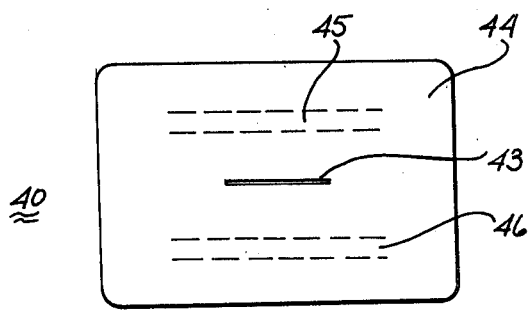
FIG. 8 is a top view of the variant.

Referring to FIGS. 6, 7 and 8, variant 40 is a regulator insertable through and positioned within a generally rectangular shaped aperture 42 disposed within the side wall of the conduit. A slit 43, which slit defines the outlet of the regulator, is disposed within a diaphragm 44. The diaphragm covers aperture 42 and extends lateral to the aperture in contacting relationship with the outer surface of the conduit circumscribing the aperture. A pair of beams 45 and 46 depend downwardly from the lower surface of diaphragm 44. The beams are located such that they bear against edges 47 and 48 of aperture 42. These beams position variant 40 with respect to aperture 42 and they, in combination with the portion of the diaphragm overlapping conduit 41, provide sufficient surface contact area intermediate the variant and the conduit to obtain an adequate bond therebetween to retain the variant in place despite high pressures within the conduit.

The specific flow control means of variant 40 will be described with particular reference to FIGS. 7, 9 and 10 and 11. A pair of skirts 50 and 51 depend downwardly from diaphragm 44 from either side of slit 43. The lower end of these skirts are terminated by a pair of downwardly laterally oriented lips 52 and 53. Edge 54, defined by the junction between skirt 50 and diaphragm 44 defines one side of slit 43. Edge 55, formed at the junction of skirt 51 and diaphragm 44 defines another side of slit 43. Lateral to the extremities of slit 43, skirts 50 and 51 are joined to one another and to diaphragm 44.

Figure 10:
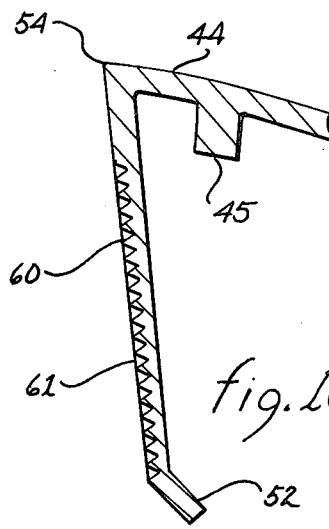
FIG. 10 is a partial cross-sectional view taken along lines 9—9, as shown in FIG. 8.
Figure 9:
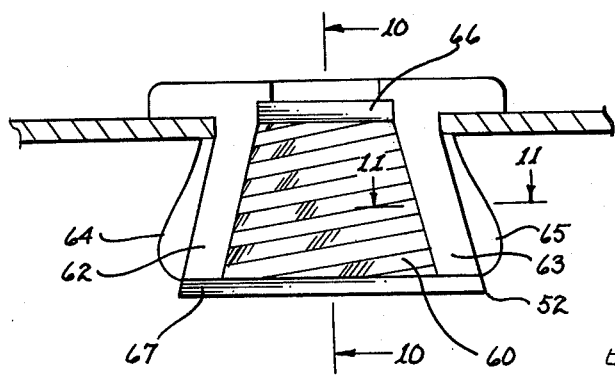
FIG. 9 is a side view taken along lines 8—8, as shown in FIG. 7.
Figure 11:
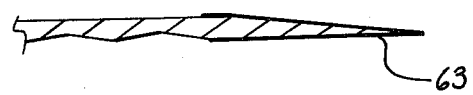
FIG. 11 is a partial cross-sectional view taken along lines 10—10, as shown in FIG. 8.

Referring specifically to FIGS. 9, 10 and 11, the construction of the skirts will be described with specific detail. A plurality of stria or striae 60 are disposed within a trapezoidal-like envelope within surface 61 of skirt 50. Planar surfaces 62 and 63, which planar surfaces are laterally terminated by smooth surfaced membrane-like flashings 64 and 65, are disposed at either side of striae 60. A further planar surface 66 is disposed intermediate planar surfaces 62 and 63 along the upper edge of striae 60. The junction between lip 52 and skirt 50 is defined by an edge 67, which edge also defines the lower extremities of striae 60 and planar surfaces 62 and 63.

The orientation of striae 60 is approximately 15° with respect to edge 67. Thus, when skirts 50 and 50a are juxtaposed with one another, the respective striae are oriented at approximately 150° with respect to one another. This orientation has an effect upon the size of the interstices intermediate skirts 50 and 50a and it has been determined that the above identified angular orientation provides highly satisfactory results.

Flashings 64 and 65 are produced through the molding process during fabrication of variant 40. These flashings may be severed as is normal, however, it has been learned that due to their flexibility, they, in combination with planar surfaces 62 and 63, substantially contribute to the fluid seal lateral to striae 60 when the pressure within conduit 41 is relatively high. Hence, the flashings need not be removed; this unexpected result further reduces the cost in fabricating variant 40.

The operation of variant 40 is essentially identical to that of regulator 2 described above.

Figures 12, 13, 14:
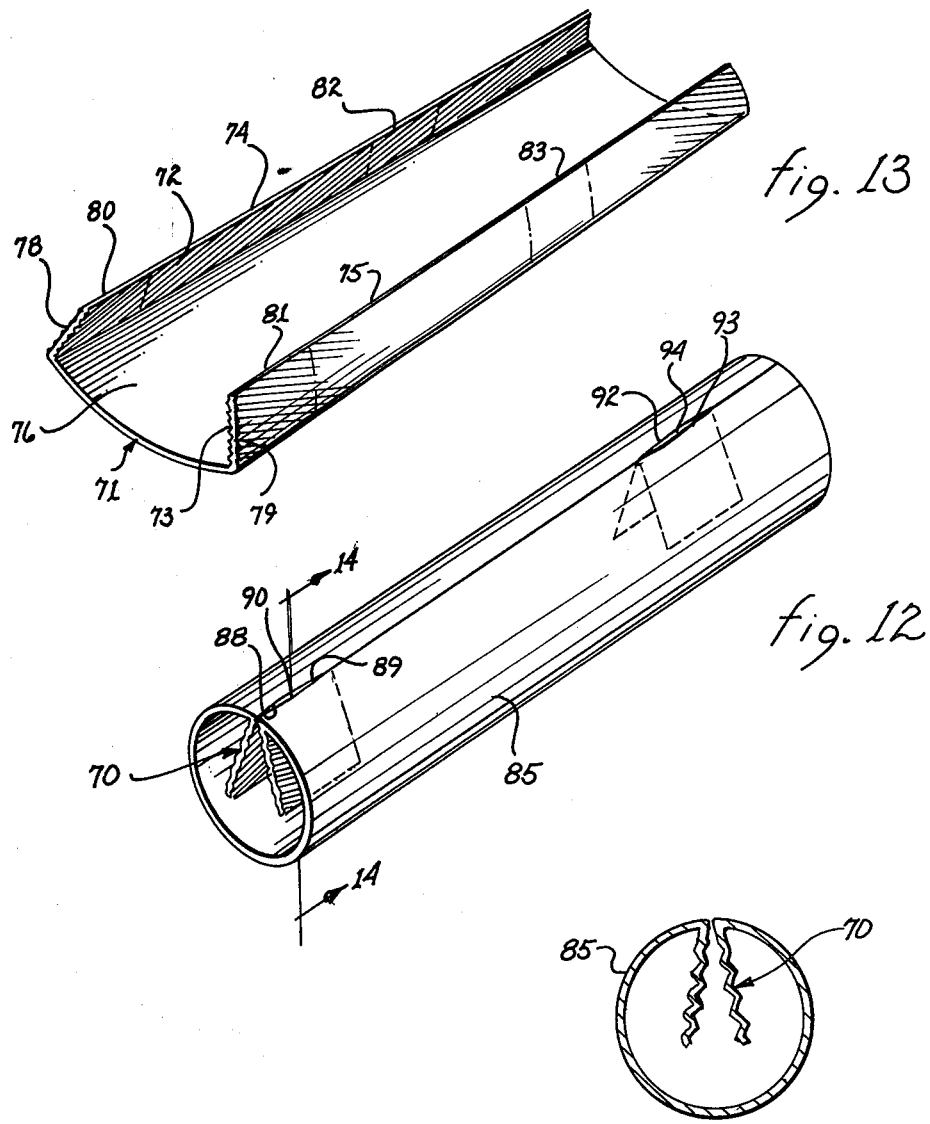
FIG. 12 illustrates a further variant of a fluid regulator.
FIG. 13 illustrates the further variant in an initial stage of construction.
FIG. 14 illustrates a cross-section of the variant shown in FIG. 12, taken along lines 14—14.

A further variant 70 is illustrated in FIGS. 12, 13, and 14. Its operation is identical to that described above for regulator 2 and variant 40. However, its structure is a simplification thereof and particularly useful for limited life fluid flow regulators which do not require highly accurately metered fluid discharge rates.

Variant 70 is constructed from a ribbon 71 of conduit material. Elongated striated surfaces 72, 73 are formed on one side of the ribbon along the opposed longitudinal edges 74, 75. The striae can be molded during fabrication of the ribbon, cut into the surfaces, or the surfaces may be crimped. Regardless of the manner by which the striae are introduced, the best results of variant 70 are obtained if their orientation is maintained at an angle of 15° with respect to edges 74 and 75. These surfaces are bent with respect to the central part 76 of the ribbon to define flange-like walls 78 and 79 extending therefrom at an acute angle. In this state, ribbon 69 resembles a U-shaped extrusion in cross-section, as illustrated in FIG. 12.

A plurality of transverse cuts are made through walls 78 and 79 to obtain a plurality of pairs of wall sections (i.e. 80 and 81, 82 and 83) each of which pairs ultimately will define one of variants 70. Ribbon 69 is bent about its longitudinal axis into a tubular configuration to define a conduit 85 such that walls 78, 79 are enclosed therein, as illustrated in FIGS. 12 and 14. The longitudinal edges at the junction of central part 76 and walls 78, 79 intermediate the pairs of wall sections (80 and 81, 82 and 83) are bonded or otherwise attached to one another, which bond maintains the tubular shape of the conduit. Edges 88, 89, defined by pair of wall sections 80, 81, are not attached to one another; instead, these edges form the orifice of outlet 90 in conduit 85. Similarly, edges 92, 93 defined by pair of wall sections 82, 83 are not attached to one another; instead, these edges form the orifice of another outlet 94 in conduit 85.

Figure 2:
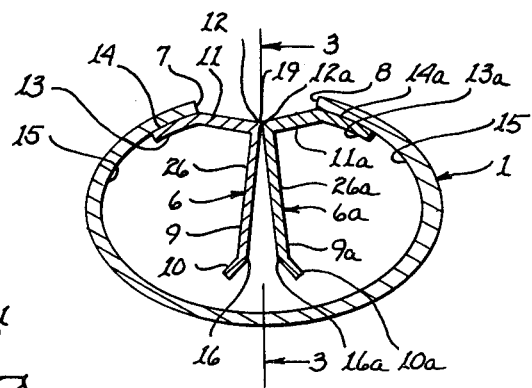
FIG. 2 is an end view of a fluid flow regulator lodged within a conduit and taken along lines 2—2, as shown in FIG. 1.
Figure 3:
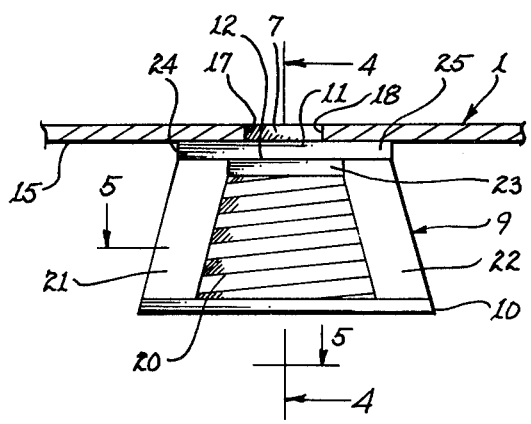
FIG. 3 is a side view taken along lines 3—3, as shown in FIG. 2.
Figure 4:
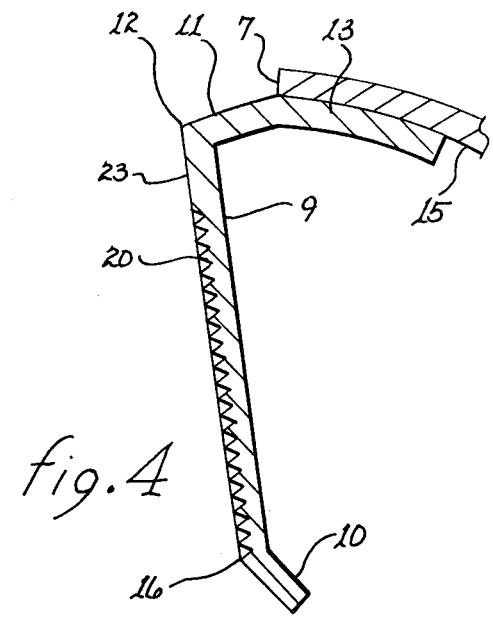
FIG. 4 is a cross-sectional view taken along lines 4—4, as shown in FIG. 3.

From the above description, it will become evident that the wall sections (80, 81, 82 and 83) are similar in configuration to the skirts 6, 6a shown in FIGS. 2, 3, and 4 and skirts 50, 50a shown in FIGS. 7, 9 and 10; furthermore, their operation is essentially equivalent to the earlier discussed skirts. To recapitulate, the striae of opposed striated surfaces 72 and 73 establish a pressure gradient therebetween within the fluid path flowing therethrough from within conduit 85 and discharging through outlet 90. The pressure gradient, in conjunction with the ambient fluid pressure within the conduit regulates the volumetric fluid discharge rate through outlet 90 to an essentially constant value despite variations in fluid pressure within the conduit. Additional details of the regulatory process described above are equally applicable to the operation of variant 70.

From the preceeding description, it will be apparent that the manufacturing costs of variant 70 will be very low. If the conduit is made of biodegradable material it may be employed for seasonal crops at a substantial savings over conventional emitter irrigation systems which must be retrieved.

While the invention has been discussed in terms alluding to its use as an emitter for irrigation systems, it is to be understood that it may have utility in many other non-related areas. In example, it may serve as an implated valve or flow regulator within living bodies. Other uses will also become evident to those skilled in the art.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A fluid flow regulator for maintaining a constant fluid discharge rate through an aperture of a conduit conveying fluid under pressure, said regulator comprising in combination:
   a. a fluid discharge outlet for discharging fluid from within the conduit, said outlet being generally coincident with the wall of the conduit;
   b. a pair of opposed flexible elements depending from opposite sides of said outlet for defining a passageway from within the conduit to said outlet, said pair of opposed flexible elements being flexibly responsive to variations in fluid pressure within the conduit for proportionally constricting said passageway; and
   c. means for establishing a pressure gradient within said passageway as a function of the water pressure within the conduit;

whereby, the rate of fluid discharge through said outlet is maintained at a constant rate despite variations in pressure within the conduit.

2. A fluid flow regulator for maintaining a constant fluid discharge rate through an aperture of a conduit conveying fluid under pressure, a plurality of apertures being disposed within the conduit and each of the apertures being coincident with the location of one of said regulators, said regulator comprising in combination:
   a. a fluid discharge outlet generally coincident with the wall of the conduit for discharging fluid from within the conduit;
   b. a pair of opposed flexible elements depending from opposite sides of said outlet for defining a passageway from within the conduit to said outlet, said pair of opposed flexible elements being flexibly responsive to variations in fluid pressure within the conduit for proportionally constricting said passageway, each element of said pair of elements including:
      i. a planar section attached to the inner surface of the conduit and extending across one-half of the respective one of the apertures; and
      ii. a skirt depending into the conduit from an edge of said planar section, said edge being coincident with the midpoint across the respective aperture; whereby, said pair of edges define said outlet; and
   c. means for establishing a pressure gradient within said passageway as a function of the water pressure within the conduit;

whereby, the rate of fluid discharge through said outlet is maintained at a constant rate despite variations in pressure within the conduit.

3. The regulator as set forth in claim 2 wherein said pressure gradient means comprises an area of striae disposed upon the surfaces of said pair of skirts forming said passageway.

4. The regulator as set forth in claim 3 wherein said striated area is trapezoidal shaped.

5. The regulator as set forth in claim 4 wherein the surfaces of said pair of skirts lateral to said respective striated areas are planar.

6. The regulator as set forth in claim 5 wherein the surfaces of said pair of skirts intermediate said respective striated areas and said outlet are planar.

7. A fluid flow regulator for maintaining a constant fluid discharge rate through an aperture of a conduit conveying fluid under pressure, a plurality of apertures being disposed within the conduit and each of the apertures being coincident with the location of one of said regulators, said regulator comprising in combination:
a. a fluid discharge outlet generally coincident with the wall of the conduit for discharging fluid from within the conduit, said outlet comprising:
  i. a diaphragm of a size sufficient to overlap the edges of a respective one of the apertures;
  ii. means for positioning said diaphragm in overlapping relationship with the respective aperture; and
  iii. a slit disposed within said diaphragm for defining said outlet; whereby, said regulator is attachable to the conduit by mounting said diaphragm into a respective one of the apertures;
b. a pair of opposed flexible elements depending from opposite sides of said outlet for defining a passageway from within the conduit to said outlet, said pair of opposed flexible elements being flexibly responsive to variations in fluid pressure within the conduit for proportionally constricting said passageway; and
c. means for establishing a pressure gradient within said passageway as a function of the water pressure within the conduit;

whereby, the rate of fluid discharge through said outlet is maintained at a constant rate despite variations in pressure within the conduit.

8. The regulator as set forth in claim 7 wherein said positioning means comprises a pair of beams, each of said beams being located adjacent one of the opposed edges of one of said apertures.

9. The regulator as set forth in claim 8 wherein said pressure gradient means comprises an area of striae disposed upon the surfaces of said pair of skirts forming said passageway.

10. The regulator as set forth in claim 9 wherein said striated area is trapezoidal shaped.

11. The regulator as set forth in claim 10 wherein the surfaces of said pair of skirts lateral to said respective striated areas are planar.

12. A fluid flow regulator for maintaining a constant fluid discharge rate through an aperture of a conduit conveying fluid under pressure, said regulator comprising in combination:
a. a fluid discharge outlet generally coincident with the wall of the conduit for discharging fluid from within the conduit, said outlet comprising a slit in the wall of the conduit, said slit being positioned along the line and intermediate said opposed wall sections;
b. a pair of opposed flexible elements depending from opposite sides of said outlet for defining a passageway from within the conduit to said outlet, said pair of opposed flexible elements comprising a pair of opposed lengths of wall sections extending into the conduit along a line parallel to the longitudinal axis of the conduit, said pair of opposed lengths of wall sections being flexibly responsive to variations in fluid pressure within the conduit for proportionally constricting said passageway; and
c. means for establishing a pressure gradient within said passageway as a function of the water pressure within the conduit;

whereby, the rate of fluid discharge through said outlet is maintained at a constant rate despite variations in pressure within the conduit.

13. The regulator as set forth in claim 12 wherein said pressure gradient means comprises striae disposed in said wall sections, said striae of one of said wall sections being in a non-parallel relationship to the striae of an opposed one of said wall sections.

14. The regulator as set forth in claim 13 wherein said striae of said one and said opposed one of said wall sections comprise a crimped section of said one and said opposed one of said wall sections.

15. A conduit having a plurality of integrally formed regulators for discharging at a constant rate fluid contained under pressure within said conduit, said conduit comprising in combination:
a. a ribbon of material for forming said conduit by bending said ribbon about its longitudinal axis and securing the lateral edges of said ribbon to one another;
b. fluid discharge outlets generally coincident with the wall of said conduit and disposed intermediate lateral edges of said ribbon for discharging fluid from within the conduit;
c. a pair of walls extending from the longitudinal edges of said ribbon at an acute angle for defining opposed flexible elements upon formation of the conduit, said pair of walls being cut into a plurality of pairs of opposed wall sections for defining a passageway from within said conduit to a respective one of said outlets, each said pair of opposed wall sections being flexibly responsive to variations in fluid pressure within said conduit for proportionally constricting said passageway;
d. a slit for defining each of said outlets, each said slit being disposed along said conduit intermediate selected ones of said opposed wall sections; and
e. means for establishing a pressure gradient within the passageway as a function of the water pressure within said conduit;

whereby, the rate of fluid discharge through each of said outlets is maintained at a constant rate despite variations in pressure within said conduit.

16. The regulator as set forth in claim 15 wherein said ribbon and said pair of walls are formed of biodegradable material.

* * * * *